(12) United States Patent
Spain

(10) Patent No.: US 8,712,428 B2
(45) Date of Patent: *Apr. 29, 2014

(54) LOCATION ESTIMATION OF WIRELESS TERMINALS THROUGH PATTERN MATCHING OF DEDUCED SIGNAL STRENGTHS

(75) Inventor: David Stevenson Spain, Portola Valley, CA (US)

(73) Assignee: Polaris Wireless, Inc., Mountain View, CA (US)

(*) Notice: Subject to any disclaimer, the term of this patent is extended or adjusted under 35 U.S.C. 154(b) by 1532 days.

This patent is subject to a terminal disclaimer.

(21) Appl. No.: 10/668,634

(22) Filed: Sep. 23, 2003

(65) Prior Publication Data

US 2005/0014511 A1    Jan. 20, 2005

Related U.S. Application Data

(60) Provisional application No. 60/488,866, filed on Jul. 19, 2003.

(51) Int. Cl.
H04W 24/00 (2009.01)
(52) U.S. Cl.
USPC ............ 455/456.1; 455/456.2; 455/440
(58) Field of Classification Search
CPC ............................................... H04W 4/02
USPC ................ 342/450, 457, 444; 455/440, 455/456.1–456.4

See application file for complete search history.

(56) References Cited

U.S. PATENT DOCUMENTS

| | | | | |
|---|---|---|---|---|
| 4,818,998 A | * | 4/1989 | Apsell et al. | 342/444 |
| 4,891,650 A | * | 1/1990 | Sheffer | 342/457 |
| 4,908,629 A | * | 3/1990 | Apsell et al. | 342/457 |
| 4,965,850 A | * | 10/1990 | Schloemer | 455/450 |
| 5,293,642 A | * | 3/1994 | Lo | 455/456.2 |
| 5,295,180 A | * | 3/1994 | Vendetti et al. | 455/456.2 |
| 5,390,339 A | * | 2/1995 | Bruckert et al. | 455/440 |
| 5,564,075 A | * | 10/1996 | Gourgue | 455/69 |
| 5,859,838 A | * | 1/1999 | Soliman | 370/249 |
| 5,974,329 A | * | 10/1999 | Wylie et al. | 455/456.1 |

(Continued)

FOREIGN PATENT DOCUMENTS

| | | | | |
|---|---|---|---|---|
| EP | 1198150 A1 | * | 4/2002 | H04Q 7/38 |
| JP | 7231473 A | | 8/1995 | |

(Continued)

OTHER PUBLICATIONS

Matsuno, "JP Application No. 2006-520314 Office Action Apr. 16, 2010",, Publisher: JPO, Published in: JP.

*Primary Examiner* — Charles Shedrick

(74) *Attorney, Agent, or Firm* — Kaplan Breyer Schwarz & Ottesen, LLP

(57) ABSTRACT

A method of estimating the location of a wireless terminal without the addition of hardware to either the wireless terminal or to the telecommunication system's base stations is disclosed. The illustrative embodiment of the present invention is based on the observation that the signal strength of a signal from a transmitter is different at some locations, and, therefore, the location of a wireless terminal can be estimated by comparing the signal strength it currently observes against a map or database that correlates locations to signal strengths. Furthermore, the illustrative embodiment deduces the signal strength of the serving base station's control channel signal at the wireless terminal, $R_D$, based on the principal of reciprocity.

42 Claims, 13 Drawing Sheets

(56) References Cited

U.S. PATENT DOCUMENTS

| | | | |
|---|---|---|---|
| 5,999,144 A * | 12/1999 | Caille et al. | 343/853 |
| 6,128,486 A * | 10/2000 | Keskitalo et al. | 455/422.1 |
| 6,236,365 B1 * | 5/2001 | LeBlanc et al. | 342/457 |
| 6,249,252 B1 * | 6/2001 | Dupray | 342/450 |
| 6,266,534 B1 | 7/2001 | Raith et al. | |
| 6,317,035 B1 * | 11/2001 | Berberich et al. | 340/426.13 |
| 6,466,938 B1 | 10/2002 | Goldberg | |
| 6,580,701 B1 * | 6/2003 | Ylitalo et al. | 370/334 |
| 6,658,258 B1 * | 12/2003 | Chen et al. | 455/456.1 |
| 6,693,591 B2 * | 2/2004 | Ferreol et al. | 342/417 |
| 6,697,640 B1 * | 2/2004 | Katz et al. | 455/561 |
| 6,757,532 B1 * | 6/2004 | Haartsen | 455/414.1 |
| 6,799,047 B1 | 9/2004 | Bahl et al. | |
| 6,839,560 B1 * | 1/2005 | Bahl et al. | 455/456.1 |
| 7,116,987 B2 * | 10/2006 | Spain et al. | 455/456.1 |
| 2001/0022558 A1 * | 9/2001 | Karr et al. | 342/450 |
| 2002/0058479 A1 * | 5/2002 | Voyer | 455/67.1 |
| 2002/0071406 A1 * | 6/2002 | Bursztejn et al. | 370/334 |
| 2003/0064733 A1 * | 4/2003 | Okanoue et al. | 455/456 |
| 2003/0100269 A1 * | 5/2003 | Lehtinen et al. | 455/69 |
| 2003/0148761 A1 * | 8/2003 | Gaal | 455/423 |
| 2003/0220116 A1 | 11/2003 | Sagefalk et al. | |
| 2004/0057507 A1 * | 3/2004 | Rotstein et al. | 375/219 |
| 2004/0152470 A1 | 8/2004 | Spain | |
| 2004/0171385 A1 * | 9/2004 | Haustein et al. | 455/450 |
| 2004/0180671 A1 | 9/2004 | Spain, Jr. | |
| 2004/0203468 A1 * | 10/2004 | Dent et al. | 455/67.14 |
| 2005/0014511 A1 * | 1/2005 | Spain | 455/456.1 |
| 2005/0014518 A1 * | 1/2005 | Spain et al. | 455/456.5 |
| 2005/0096068 A1 * | 5/2005 | Bahl et al. | 455/456.1 |
| 2005/0176442 A1 * | 8/2005 | Ju et al. | 455/456.1 |
| 2007/0133487 A1 * | 6/2007 | Wang et al. | 370/338 |

FOREIGN PATENT DOCUMENTS

| | | |
|---|---|---|
| JP | 10051840 A | 2/1998 |
| JP | 10094040 A | 4/1998 |
| JP | 2001313972 A | 11/2001 |
| JP | 2002064323 A | 2/2002 |
| WO | WO 98/10538 | 12/1998 |

* cited by examiner

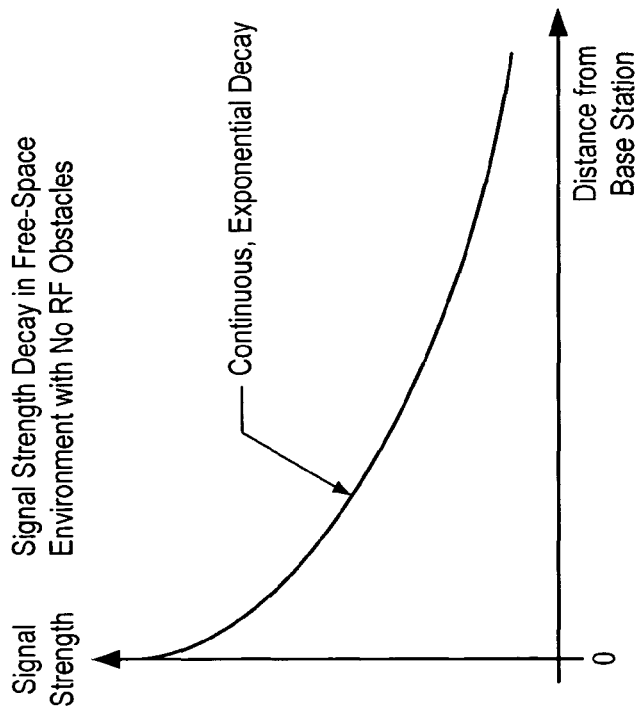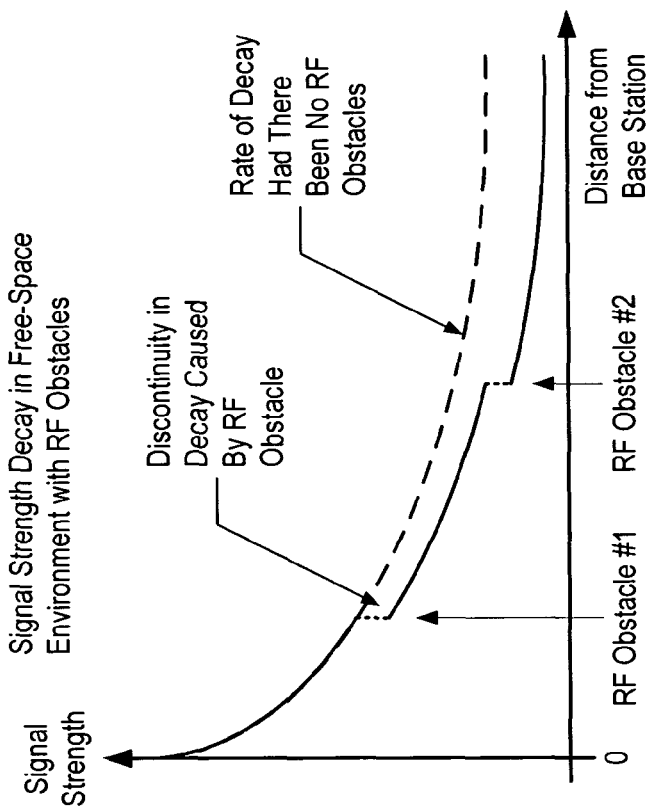

LOCATION ESTIMATION OF WIRELESS TERMINALS THROUGH PATTERN MATCHING OF DEDUCED SIGNAL STRENGTHS

CROSS-REFERENCE TO RELATED APPLICATIONS

This application claims the benefit of:
i. U.S. Provisional Patent Application No. 60/488,866, filed 19 Jul. 2003, and entitled "Location Estimation of Wireless Terminals Through Pattern Matching of Deduced Signal Strengths", which application is also incorporated by reference.

The underlying concepts, but not necessarily the nomenclature, of these applications are incorporated by reference:
i. U.S. Pat. No. 6,269,246, issued 31 Jul. 2001;
ii. U.S. patent application Ser. No. 09/532,418, filed 22 Mar. 2000;
iii. U.S. patent application Ser. No. 10/128,128, filed 22 Apr. 2002;
iv. U.S. patent application Ser. No. 10/299,398, filed 18 Nov. 2002;
v. U.S. patent application Ser. No. 10/357,645, filed 4 Feb. 2003;
vi. U.S. patent application No. 60/449,569, filed 24 Feb. 2003; and
vii. U.S. patent application No. 60/461,219, filed 8 Apr. 2003.

FIELD OF THE INVENTION

The present invention relates to telecommunications in general, and, more particularly, to a technique for estimating the location of a wireless terminal.

BACKGROUND

FIG. 1 depicts a map of a geographic region that is serviced by a wireless telecommunications system, which system provides wireless telecommunications service to wireless terminals (e.g., wireless terminal 101) within the region. The heart of the telecommunications system is wireless switching center 110, which might also be known as a mobile switching center ("MSC") or a mobile telephone switching office ("MTSO").

Typically, wireless switching center 111 is connected through a plurality of intermediate network elements (e.g., base station controllers, etc.) to a plurality of base stations (e.g., base stations 102-1, 102-2, and 102-3), which are dispersed throughout the geographic area serviced by the system. As depicted in FIG. 1, base station 102-2 serves wireless terminal 101.

As is well known to those skilled in the art, wireless switching center 111 is responsible for, among other things, establishing and maintaining calls between wireless terminals and between a wireless terminal and a wireline terminal (which is connected to the system via the local and/or long-distance telephone networks and which are not shown in FIG. 1).

The salient advantage of wireless telecommunications over wireline telecommunications is the mobility that is afforded to the users of the wireless telecommunications system. On the other hand, the salient disadvantage of wireless telecommunications lies in that fact that because the user is mobile, an interested party might not be able to readily ascertain the location of the user.

Such interested parties might include both the user of the wireless terminal and remote parties. There are a variety of reasons why the user of a wireless terminal might be interested in knowing his or her own location. For example, the user might be interested in telling a remote party where he or she is.

There are a variety of reasons why a remote party might be interested in knowing the location of the user. For example, the recipient of a 911 emergency call from a wireless terminal might be interested in knowing the location of the wireless terminal so that emergency services vehicles can be dispatched to that location.

There are many techniques in the prior art for estimating the location of a wireless terminal.

In accordance with one technique, the location of a wireless terminal is estimated to be at the center of the cell in which the wireless terminal is located. This technique is advantageous in that it does not require that additional hardware be added to the wireless terminal or to the wireless telecommunications system, and this means that the first technique can be inexpensively implemented in legacy systems. The first technique is only accurate, however, to a few kilometers, and, therefore, it is generally not acceptable for applications (e.g., emergency services dispatch, etc.) that require higher accuracy.

In accordance with a second technique, the location of a wireless terminal is estimated by triangulating the angle of arrival or the time of arrival of the signals transmitted by the wireless terminal to be located at various receivers. This technique is accurate to within a few hundreds of meters and is advantageous in that it can be used with legacy wireless terminals. It is disadvantageous, however, in that it generally requires that hardware be added to the telecommunication system's base stations, and this is very expensive.

In accordance with a third technique, the location of a wireless terminal is estimated by a radio navigation unit, such as a Global Positioning System (GPS) receiver, that is incorporated into the wireless terminal. This technique is accurate to within tens of meters and is advantageous in that it does not require that additional hardware be added to the telecommunication system's infrastructure. The third technique is disadvantageous, however, in that it cannot be used with legacy wireless terminals that do not comprise a radio navigation unit.

Therefore, the need exists for a technique for estimating the location of a wireless terminal with higher resolution than the first technique and that can be inexpensively implemented in legacy systems.

SUMMARY OF THE INVENTION

The present invention enables the estimation of the location of a wireless terminal without the addition of hardware to either the wireless terminal or to the telecommunication system's base stations. Some embodiments of the present invention are, therefore, ideally suited for use with legacy telecommunications systems.

The illustrative embodiment of the present invention is based on the observation that the signal strength of a signal from a transmitter is different at some locations, and, therefore, the location of a wireless terminal can be estimated by comparing the signal strength it currently observes against a map or database that correlates locations to signal strengths. For example, if a particular radio station is known to transmit a strong signal to a first location and a weak signal to a second location, and a given wireless terminal at an unknown location is receiving the radio station with a weak signal, it is more likely that the wireless terminal is at the second location than it is at the first location.

The accuracy of the estimate of the location of a wireless terminal can be enhanced when the principle uses multiple transmitters and multiple signals. A simplified example illustrates this point. A first radio station, Radio Station A, transmits a strong signal to Location 1 and Location 2, but a weak signal to Location 3 and Location 4, and a second radio station, Radio Station B, transmits a strong signal to Location 1 and Location 3, but a weak signal to Location 2 and Location 4. This information is summarized in the table below and forms the basis for a map or database that correlates locations to signal strength.

TABLE 1

Illustrative Signal Strength Database (Absolute Signal Strength)

| | Radio Station A | Radio Station B |
|---|---|---|
| Location 1 | Strong Signal | Strong Signal |
| Location 2 | Strong Signal | Weak Signal |
| Location 3 | Weak Signal | Strong Signal |
| Location 4 | Weak Signal | Weak Signal |

If a given wireless terminal at an unknown location receives Radio Station A with a weak signal and Radio Station B with a strong signal, it is more likely that the wireless terminal is at Location 3 than it is at either Location 1, 2, or 4.

Furthermore, the accuracy of the estimate of the location of a wireless terminal can be enhanced when the signal strength of each signal at each location is quantified. A simplified example illustrates this point. If a particular radio station is known to be received in one location with a strength of −50 dBm, at a second location with a strength of −53 dBm, and at a third location with a strength of −55 dBm, then the reception of the signal with a strength of −56 dBm suggests that the wireless terminal is more likely at the third location than at either the first or second location.

In the prior art, a wireless terminal measures the signal strength of the control channels of the base stations that it can receive and that are not serving it and reports some or all of those signal-strength measurements back to the wireless switching center. In the prior art this is performed so that the wireless switching center can intelligently decide which base station the wireless terminal should be served by. In accordance with the illustrative embodiment of the present invention, these signal-strength measurements are also used, in conjunction with a map or database that correlates locations to signal strength, to estimate the location of the wireless terminal.

In general, more signal-strength measurements provide a better estimate of the location of the wireless terminal than fewer signal-strength measurements, and, therefore, the acquisition of additional signal-strength measurements is typically advantageous. One way of acquiring an additional signal-strength measurement is to actually physically measure a signal at the wireless terminal, but most legacy terminals are not equipped to measure and report on an arbitrary number of signals.

Another way of acquiring a "signal-strength measurement" is by inference or deduction based on other information, and this is what the illustrative embodiment does.

In particular, the illustrative embodiment deduces the signal strength of the serving base station's control channel signal at the wireless terminal, $R_D$, based on the principal of reciprocity. The principal of reciprocity states that the attenuation of a signal transmitted from Point A to Point B is the same as that for that signal as transmitted from Point B to Point A.

In other words, the signal strength of the serving base station's control channel signal at the wireless terminal, $R_D$, can be deduced from the strength at which the control channel signal is transmitted by the base station, $T_D$, and the attenuation of that signal between the base station and the wireless terminal, $A_D$, by the function:

$$R_D = T_D - A_D \quad \text{(Eq. 1)}$$

The principal of reciprocity indicates that the attenuation of the signal between the base station and the wireless terminal, $A_D$, equals the attenuation of that signal between the wireless terminal and the base station, $A_U$, as represented by Equation 2:

$$A_D = A_U \quad \text{(Eq. 2)}$$

The attenuation of the signal between the wireless terminal and the base station, $A_U$, is equal to the strength at which the signal is transmitted by the wireless terminal, $T_U$, minus the signal strength of the signal as measured by the base station, $R_U$, as represented by Equation 3:

$$A_U = T_U - R_U \quad \text{(Eq. 3)}$$

By substituting Equation 3 into Equation 2 and Equation 2 into Equation 1, the signal strength of the serving base station's control channel signal at the wireless terminal, $R_D$, can be deduced from the strength at which the control channel signal is transmitted by the base station, $T_D$, the strength at which the signal is transmitted by the wireless terminal, $T_U$, and the signal strength of the signal as measured by the base station, $R_U$, as represented by Equation 4:

$$R_D = T_D - (T_U - R_U) \quad \text{(Eq. 4)}$$

The deduced value of $R_D$ is then used to estimate the location of the wireless terminal in exactly the same way as the measured signal-strength measurements, $R_1 \ldots R_{n-1}$ as the nth signal-strength measurement, $R_n$.

The illustrative embodiment comprises: deducing a signal strength of a first signal, $R_D$, at a wireless terminal based on a transmit strength of a second signal, $T_U$, that is transmitted by the wireless terminal; and estimating the location of the wireless terminal based on the signal strength of the first signal, $R_D$.

BRIEF DESCRIPTION OF THE DRAWINGS

FIG. 7a depicts a graph that shows that the signal-strength of an electromagnetic signal decreases, in general, as a function of the distance from the transmitter and in an environment with no radio frequency obstacles.

FIG. 7b depicts a graph that shows that the signal-strength of an electromagnetic signal decreases, in general, as a function of the distance from the transmitter and in an environment with two radio frequency obstacles.

DETAILED DESCRIPTION

Figure 1:
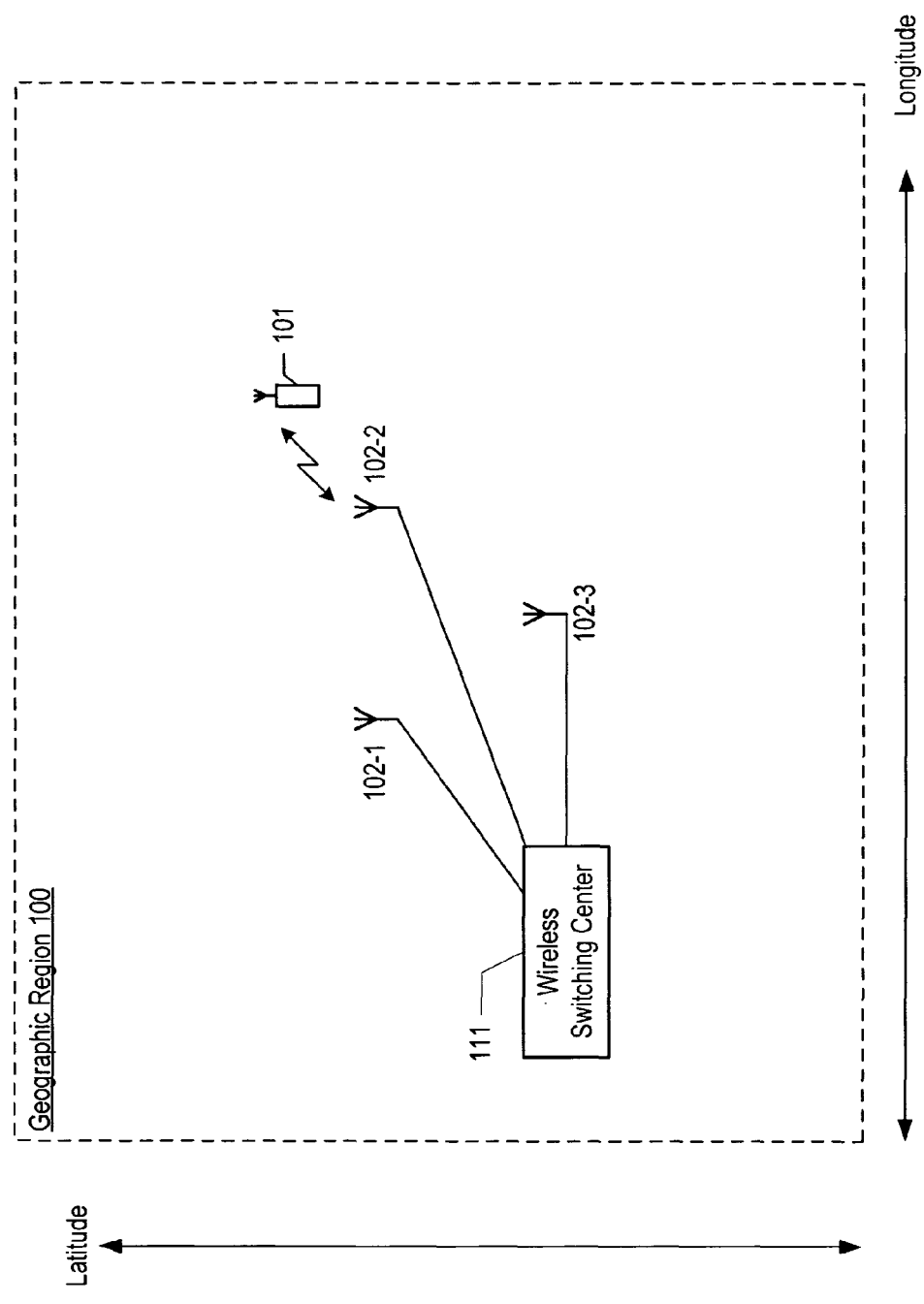
FIG. 1 depicts a map of a portion of a wireless telecommunications system in the prior art.
Figure 2:
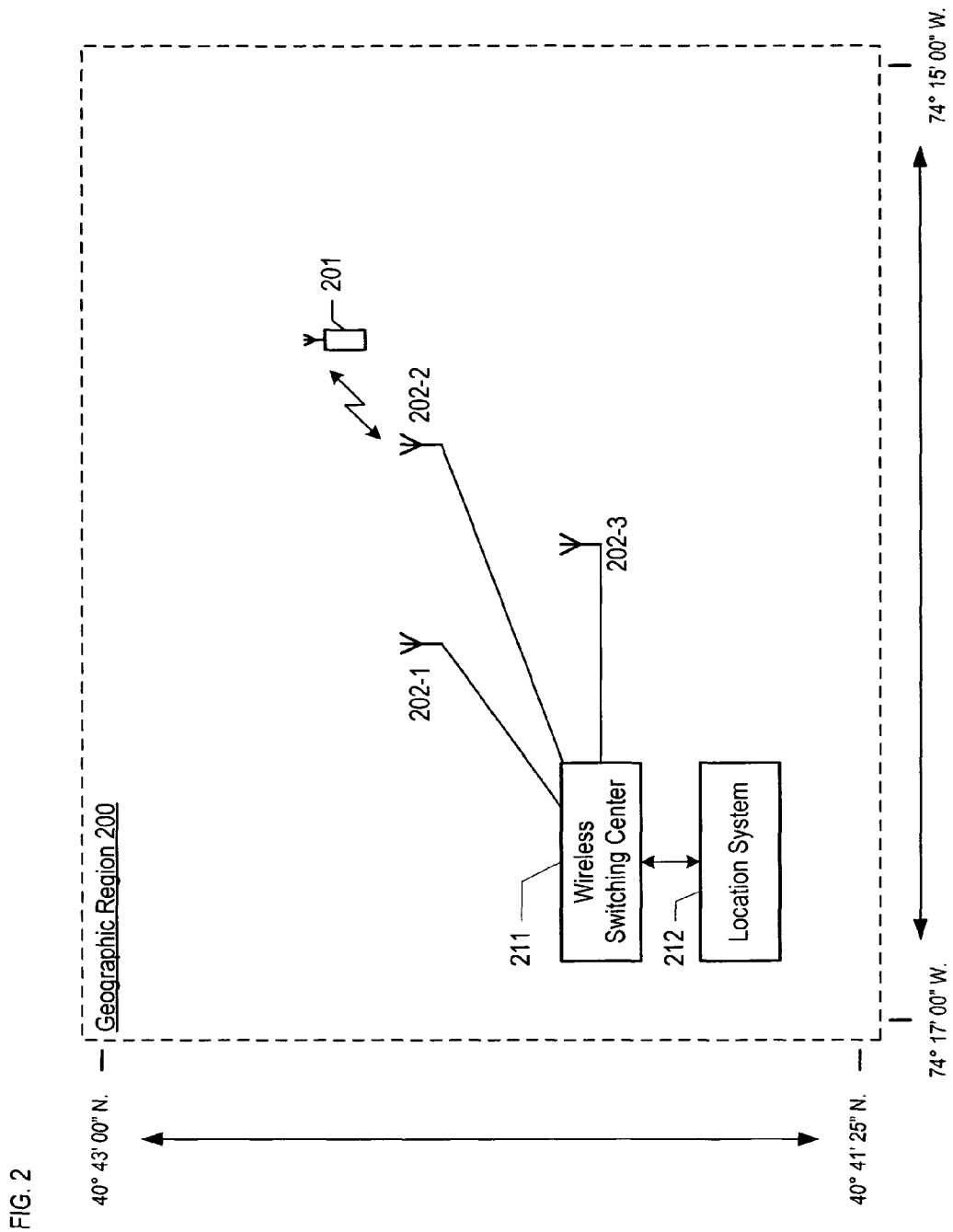
FIG. 2 depicts a map of the illustrative embodiment of the present invention.

FIG. 2 depicts a map of the illustrative embodiment of the present invention, which comprises: wireless switching center 211, location system 212, base stations 202-1, 202-2, and 202-3, and wireless terminal 201, which are interconnected as shown. The illustrative embodiment provides wireless telecommunications service to most of geographic region 200, in well-known fashion, and is also capable of estimating the location of wireless terminal 201 within geographic region 200.

The illustrative embodiment operates in accordance with the Global System for Mobile Communications (formerly known as the Groupe Speciale Mobile), which is ubiquitously known as "GSM." After reading this disclosure, however, it will be clear to those skilled in the art how to make and use embodiments of the present invention that operate in accordance with other protocols, such as the Universal Mobile Telephone System ("UMTS"), CDMA-2000, and IS-136 TDMA.

Wireless switching center 211 is a switching center as is well-known to those skilled in the art in most respects but is different in that it is capable of communicating with location system 212 in the manner described below. After reading this disclosure, it will be clear to those skilled in the art how to make and use wireless switching center 211.

Base stations 202-1, 202-2, and 202-3 are well-known to those skilled in the art and communicate with wireless switching center 211 through cables and other equipment (e.g., base station controllers, etc.) that are not shown in FIG. 2. As depicted in FIG. 2, wireless terminal 201 is serviced by base station 202-2. Although the illustrative embodiment comprises three base stations, it will be clear to those skilled in the art how to make and use embodiments of the present invention that comprise any number of base stations.

Wireless terminal 201 is a standard GSM wireless terminal as is currently manufactured and used throughout the world. Wireless terminal 201 is equipped, in well-known fashion, with the hardware and software necessary to measure and report to wireless switching center 211 on the signal-strength of signals from the base stations that are not serving wireless terminal 201 (i.e., base stations 202-1 and 202-3).

A GSM wireless terminal, such as wireless terminal 201, is capable of reporting the signal strength of a signal as one of 64 levels between −47 dBm and −110 dBm. Any signal stronger than −47 dBm is reported as −47 dBm, and any signal weaker than −110 dBm is reported as −110 dBm.

In accordance with the illustrative embodiment of the present invention all of the specific portions of the radio frequency spectrum fall within the same band that wireless terminal 201 uses to communicate with base stations 202-1, 202-2, and 202-3. In some alternative embodiments of the present invention, however, some or all of the specific portions of the radio frequency spectrum are outside the band that wireless terminal 201 uses to communicate with base stations 202-1, 202-2, and 202-3. In any case, it will be clear to those skilled in the art how to make and use wireless terminal 201.

Location system 212 is a computer system that is capable of estimating the location of wireless terminal 201, as described in detail below. Although the illustrative embodiment depicts location system 212 as estimating the location of only one wireless terminal, it will be clear to those skilled in the art that location system 212 is capable of estimating the location of any number of wireless terminals serviced by wireless switching center 211.

Furthermore, although location system 212 is depicted in FIG. 2 as a distinct entity from wireless switching center 211, this is done principally to highlight the distinction between the functions performed by wireless switching center 211 and the functions performed by location system 212. In other words, it will be clear to those skilled in the art how to make and use embodiments of the present invention in which location system 212 resides within or without wireless switching center 211.

Furthermore, although—again for pedagogical purposes—wireless switching center 211, location system 212, and base stations 202-1, 202-2, and 202-3 are depicted in FIG. 2 as being within geographic region 200 (i.e., the region of candidate locations for wireless terminal 201), this is not necessarily so, and it will be clear to those skilled in the art how to make and use embodiments of the present invention in which some or all of these pieces of equipment are not within the region of location estimation.

Figure 3:
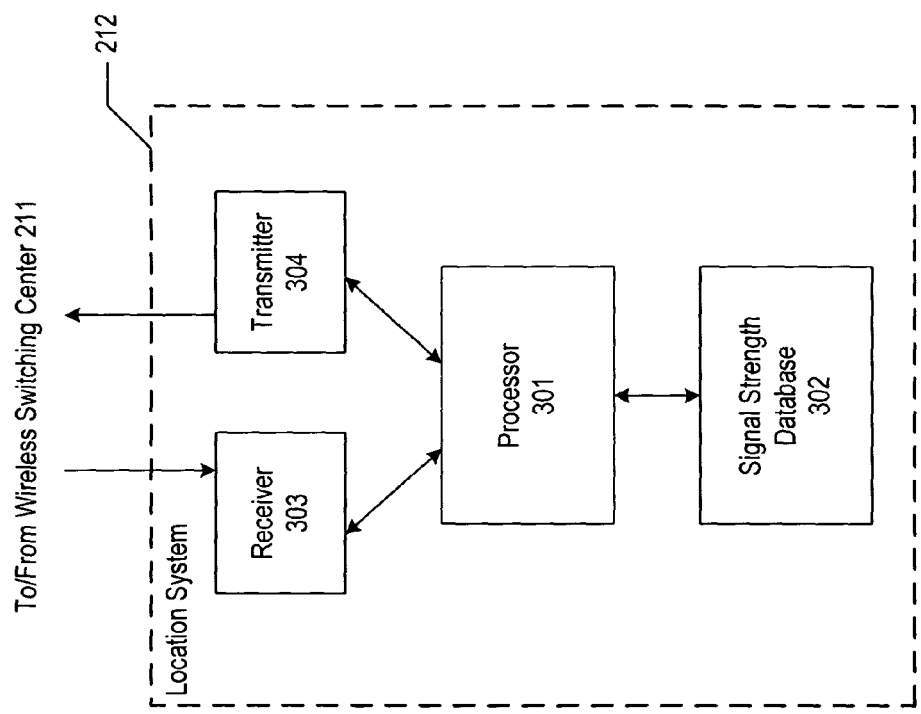
FIG. 3 depicts a block diagram of the salient components of location system 212.

FIG. 3 depicts a block diagram of the salient components of location system 212 in accordance with the illustrative embodiment.

As shown in FIG. 3, location system 212 comprises: processor 301, signal-strength database 302, receiver 303, and transmitter 304, which are interconnected as shown.

Receiver 303 receives information from wireless switching center 211, as disclosed below and with respect to FIG. 4, and forwards this information to processor 302.

Processor 301 is a general-purpose processor as is well-known in the art that is capable of performing the operations described below and with respect to FIG. 4. Processor 302 receives input from receiver 303 and sends output to transmitter 304 in well-known fashion.

Signal-strength database 302 is a non-volatile memory that stores signal-strength measurements as described below and with respect to FIG. 4.

Transmitter 304 receives output from processor 301 and transmits this output to wireless switching center 211 in well-known fashion.

Figure 4:
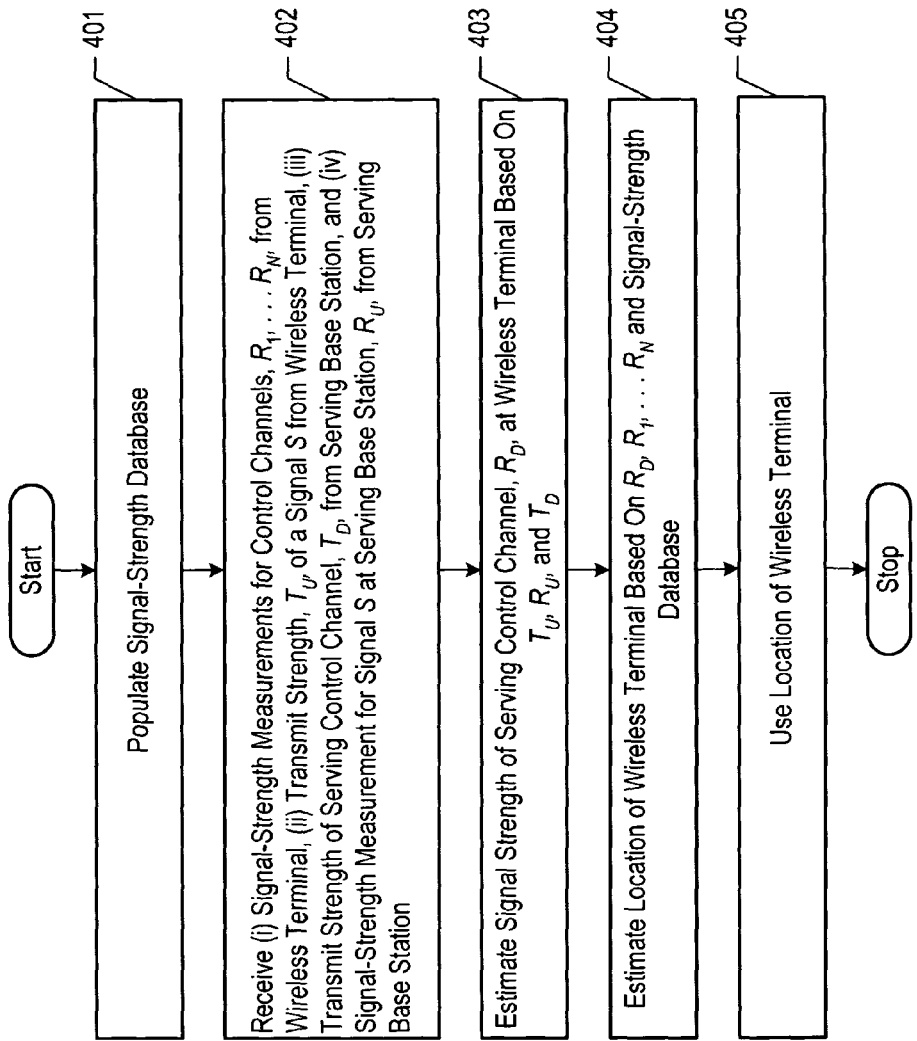
FIG. 4 depicts a broad overview of the salient operations performed by the illustrative embodiment in ascertaining the location of wireless terminal 201 in geographic region 200.

Overview—FIG. 4 depicts a broad overview of the salient operations performed by the illustrative embodiment in ascertaining the location of wireless terminal 201 in geographic region 200. In summary, the tasks performed by the illustrative embodiment can be grouped for ease of understanding into four operations:

i. the population of signal-strength database 302, ii. the receipt of transmit power and signal-strength measurements from wireless terminal 201 and base station 202-2, iii. the estimation of the location of wireless terminal 201, and iv. the use of the estimated location of wireless terminal 201.

The details of each of these operations are described briefly below and in detail afterwards with respect to FIGS. 5 though 13.

At operation 401, signal-strength database 302 associates each location within geographic region 200 with a tuple of signal-strength measurements for specific signals for that location. Operation 401 is generally complex and potentially expensive, and it is, therefore, preferably performed only occasionally. The details of operation 401 are described in detail below and with respect to FIG. 5.

At operation 402, location system 212 receives the following from wireless terminal 201: (i) signal-strength measurements of control channels, $R_1 \ldots R_{n-1}$, as received by wireless terminal 201, and (ii) the transmit power of a signal S transmitted by wireless terminal 201, $T_U$, at substantially the same time at which the signal-strength measurements of control channels, $R_1 \ldots R_{n-1}$ were made. In accordance with the illustrative embodiment, wireless terminal 201 periodically or sporadically provides $R_1 \ldots R_{n-1}$ and $T_U$ to wireless switching center 211 in well-known fashion, and the measurements are forwarded to location system 212.

As part of operation 402, location system 212 receives the following from base station 202-2: (iii) the transmit power of the control channel transmitted by base station 202-2, $T_D$, and (iv) a signal-strength measurement of signal S as received by base station 202-2, $R_U$. In accordance with the illustrative embodiment, base station 202-2 periodically or sporadically provides $T_D$ and $R_U$ to wireless switching center 211 in well-known fashion, and the measurements are forwarded to location system 212. The details of operation 402 are described in detail below and with respect to FIG. 11.

At operation 403, location system 212 estimates $R_D$, the signal-strength of the serving cell control channel as received at wireless terminal 201, based on $T_U$, $T_D$, and $R_U$. In particular, location system 212 computes the uplink attenuation $A_U$ of Signal S in accordance with Equation 4:

$$R_D = T_D - (T_U - R_U) \quad \text{(Eq. 4)}$$

When $R_D$ and $R_U$ are at different frequencies, as in, for example, a frequency-division duplexed system, the effects of fast fading (i.e., Rayleigh fading) must be removed from $R_U$ to ensure that the deduced value of $R_D$ is independent of fast fading at the frequency of $R_U$. As is well known in the art, the effects of fast fading can be removed from $R_U$ through well-known filtering techniques. The details of operation 403 are described in detail below and with respect to FIG. 12.

At operation 404, location system 212 estimates the location of wireless terminal 201 based on the measured signal-strength measurements, $R_1, \ldots R_{n-1}$, the deduced signal strength measurement, $R_D$, and a map or database that correlates locations to signal strength. The details of operation 404 are described in detail below and with respect to FIG. 13.

At operation 405, location system 212 transmits the location estimated in operation 405 to an entity (not shown) for use in an application. It is well known to those skilled in the art how to use the estimated location of a wireless terminal in an application.

At this point, operations 401 through 404 are described in detail.

Figure 5:
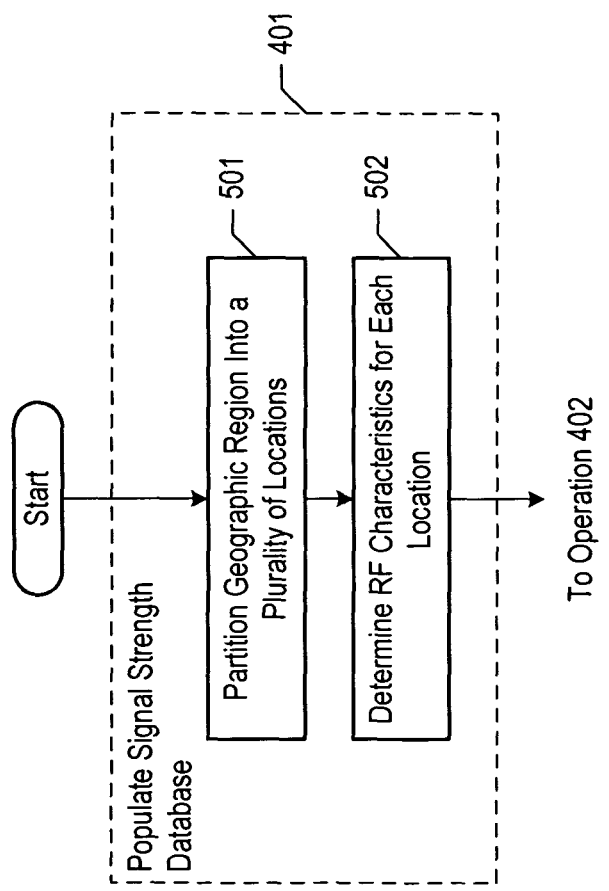
FIG. 5 depicts a flowchart of the salient operations performed in operation 401.
Figure 6:
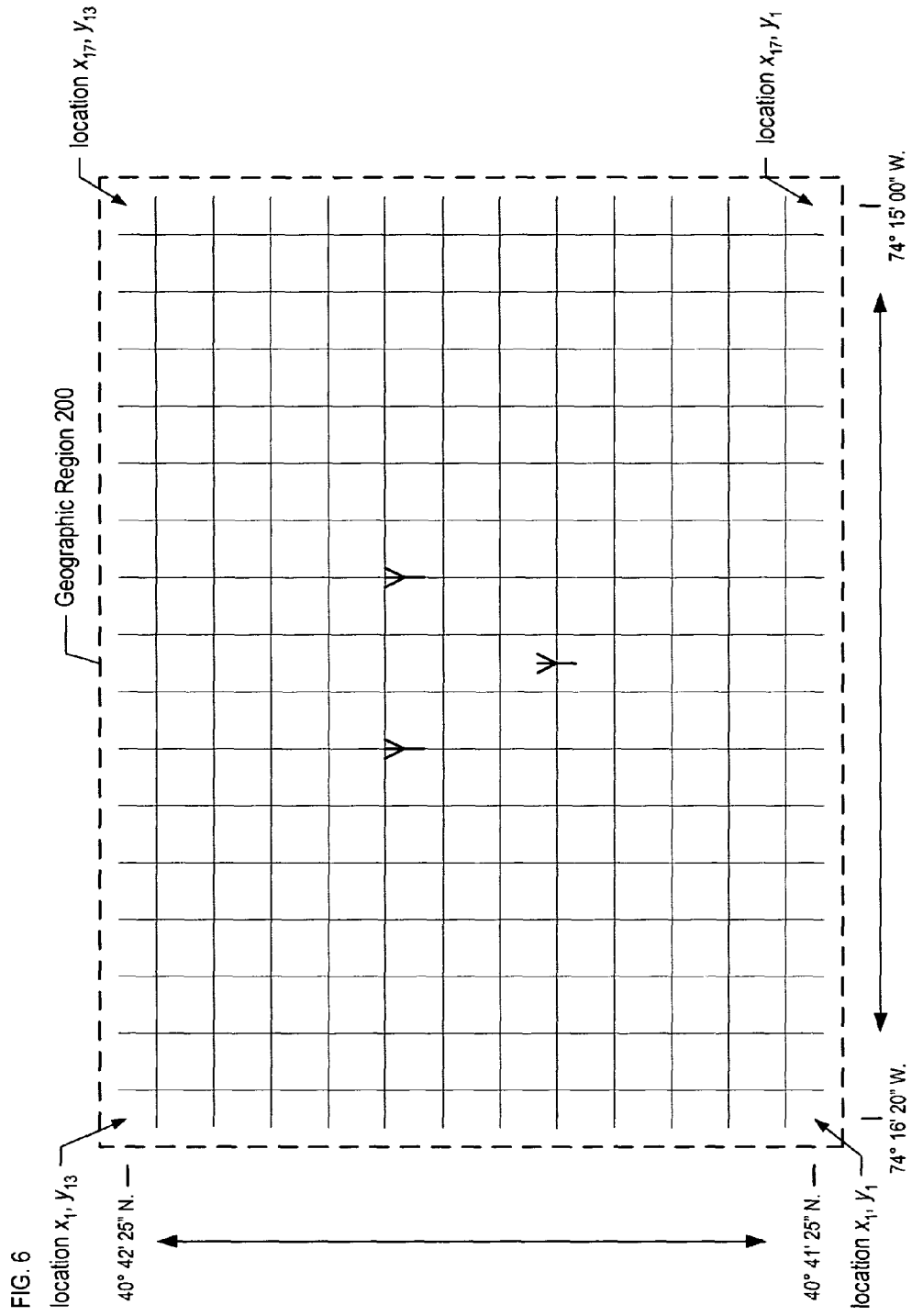
FIG. 6 depicts a map of how geographic region 200 is partitioned into 500 locations in accordance with the illustrative embodiment of the present invention.

Population of Signal-Strength Database 302—FIG. 5 depicts a flowchart of the salient operations performed in operation 401.

At task 501, geographic region 200 is partitioned into a plurality of tessellated locations. Geographic region 200 is rectangular and comprises 5,525 square arc-seconds, which near the equator equals almost 5 square kilometers. After reading this specification, it will be clear to those skilled in the art how to make and use embodiments of the present invention that operate with geographic regions of any size and shape.

In accordance with the illustrative embodiment of the present invention, geographic region 200 is partitioned into a grid of 221 square locations that are designated location $x_1, y_1$ through location $x_{17}, y_{13}$. The number of locations into which geographic location 200 is partitioned is arbitrary, subject to the considerations described below. In accordance with the illustrative embodiment, each location is an area of approximately 5 arc-seconds in length by 5 arc-seconds in height. Five arc-seconds near the equator equals approximately 150 meters.

The size of the locations defines the highest resolution with which the illustrative embodiment can locate a wireless terminal. In other words, the illustrative embodiment can only estimate the location of a wireless terminal to within one location (i.e., 5 by 5 arc-seconds in the illustrative embodiment). If greater resolution is desired, for example 1 arc-second resolution, then geographic region 200 would need to be partitioned into 1 arc-second by 1 arc-second locations. If geographic region 200 were partitioned into 1 arc-second by 1 arc-second locations, there would be 5,525 squares, which is considerably more than the 221 used in the illustrative embodiment. Although the ostensibly higher resolution of 1 arc-second versus 5 arc-seconds is advantageous, there are considerable disadvantages to a large number of locations.

The number of locations to partition geographic region 200 into is based on three factors. First, as the size of each location goes down, the resolution of the embodiment increases. Second, as the size of each location decreases, the number of locations in a region increases, and, consequently, the computational complexity of operation 404 increases quickly. Third, each location must be large enough so that it has (at least slightly) different signal-strength characteristics than its neighbor areas. This is because the illustrative embodiment might—but won't necessarily—have difficulty distinguishing between neighbor locations that have the same signal-strength characteristics. It will be clear to those skilled in the art how to consider these three factors when deciding how to partition a geographic region.

At task 502, the signal-strength measurements for a signal from each base station are determined at each location in geographic region. In accordance with the illustrative embodiment, the signal used from each base station is the control channel because it is broadcast at a constant power and because wireless terminal 201 can distinguish it from every other control channel, if it can decode its BSIC (for GSM networks).

Because there are three base stations in the illustrative embodiment, each with one control channel, a tuple of three signal-strength measurements at each location must be determined.

In general, the signal-strength of an electromagnetic signal decreases as a function of the distance from the transmitter, as is depicted in FIG. 7a, but the topography of the region and the presence of buildings, trees, and other radio-frequency obstacles severely alters this generalization, as is depicted in FIG. 7b.

In accordance with the illustrative embodiment, the tuple of three signal-strength measurements for each location are determined through a combination of:

(i) a theoretical radio-frequency propagation model, and
(ii) empirical signal-strength measurements.

It will be clear to those skilled in the art how to accomplish this.

For example, one well-known modeling for outdoor radio-frequency signal propagation is adapted from the power-law decay model. The power-law decay model assumes that the base station's antenna is high above the ground and that there is line-of-sight propagation to the wireless terminal. In this case, the mean signal-strength, P, received at the wireless terminal decays in inverse proportion to the square of the distance from the transmitter, $$P \propto \frac{1}{r^2}, \quad \text{(Eq. 5)}$$

up to some break-point. Beyond that breakpoint, the mean power at the wireless terminal decays in inverse proportion to the fourth power of the distance from the transmitter:

$$P \propto \frac{1}{r^4} \quad \text{(Eq. 6)}$$

The location of the break-point is determined through empirical signal-strength measurements as the location at which the ground bounce signal interferes with the line-of-sight signal.

In accordance with another well-known model, the signal-strength measurements at each location are determined by taking empirical measurements at various locations and by interpolating for the locations in between the sampled locations. This method is advantageous in that it does not require many empirical measurements to be made, but it is less accurate than taking measurements at every location.

It will be clear to those skilled in the art how to determine the signal-strength measurements for each location in the geographic region whether through:
(i) theoretical radio-frequency propagation models, or
(ii) empirical signal-strength measurements, or
(iii) any combination of i and ii.

Figure 8:
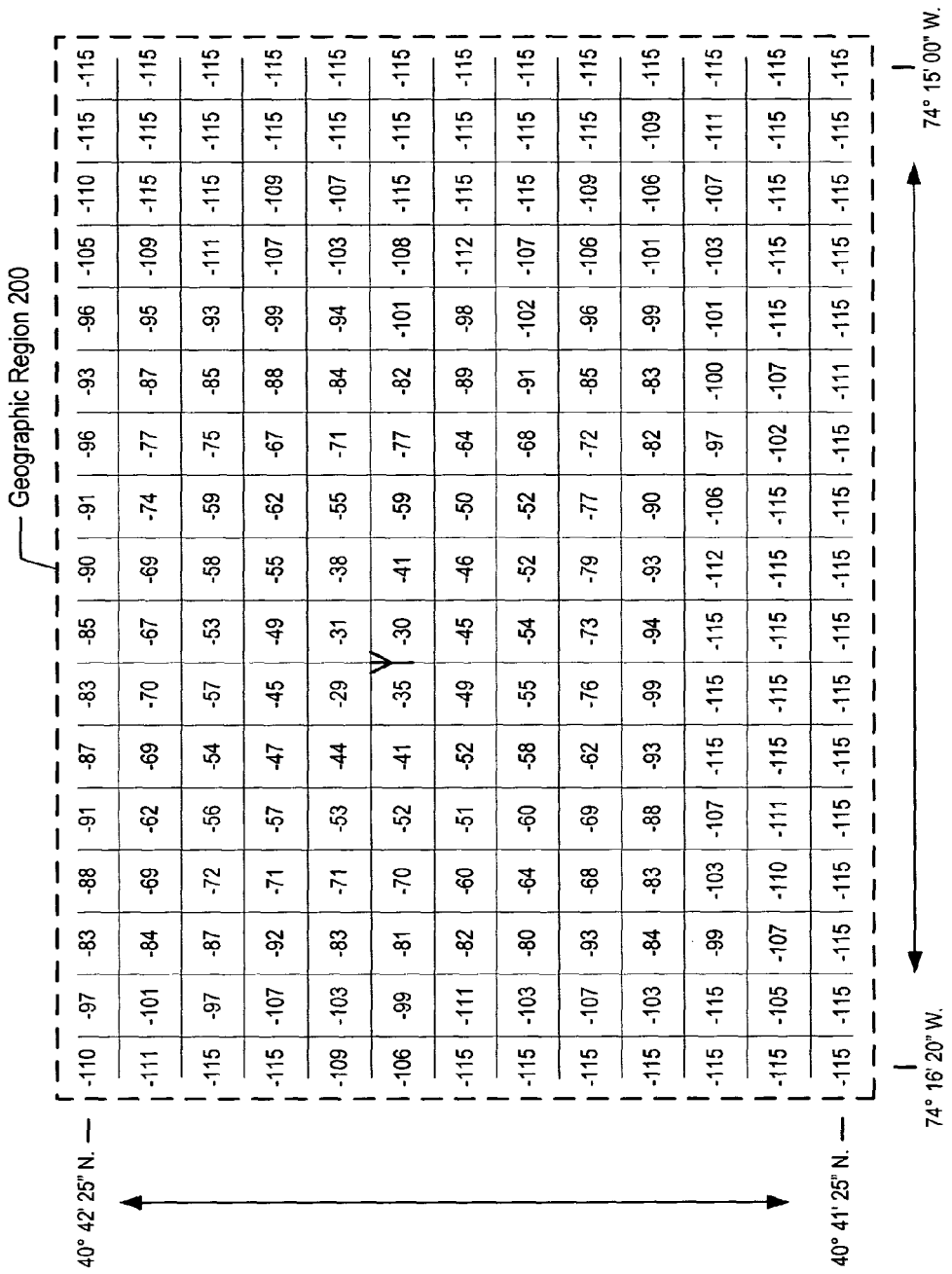
FIG. 8 depicts a map of the signal-strength measurements of the signal radiated from base station 202-1 at each location in geographic region 200.

In accordance with the illustrative embodiment, FIG. 8 depicts the signal-strength of the signal from base station 202-1 (hereinafter referred to as "Signal 1") at each location in geographic region 200. In general, Signal 1 is stronger near base station 202-1 and weaker far away from base station 202-1.

Figure 9:
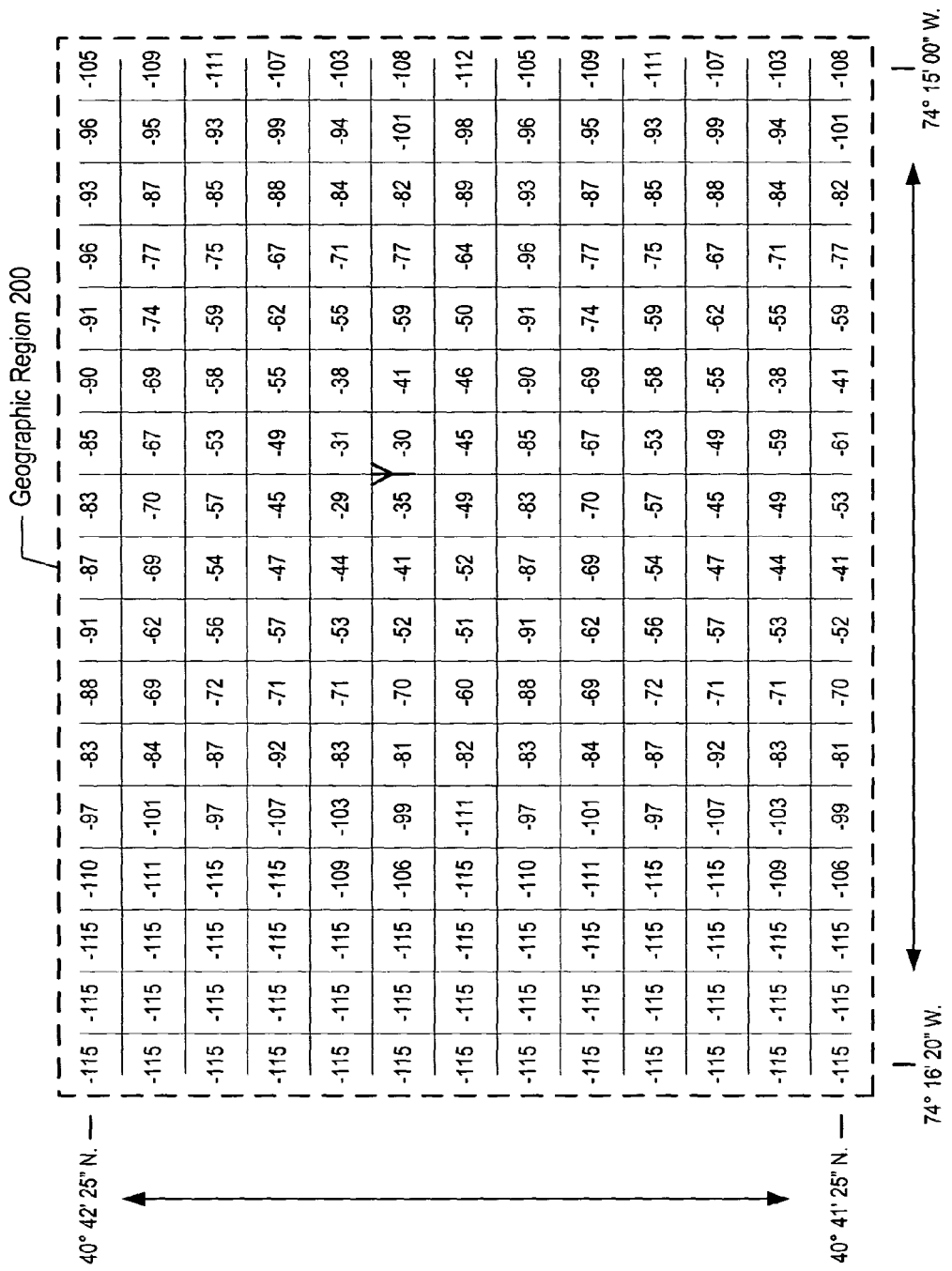
FIG. 9 depicts a map of the signal-strength measurements of the signal radiated from base station 202-2 at each location in geographic region 200.

In accordance with the illustrative embodiment, FIG. 9 depicts the signal-strength of the signal from base station 202-2 (hereinafter referred to as "Signal 2") at each location in geographic region 200. Like Signal 1, Signal 2 is stronger near base station 202-2 and weaker far away from base station 202-2.

Figure 10:
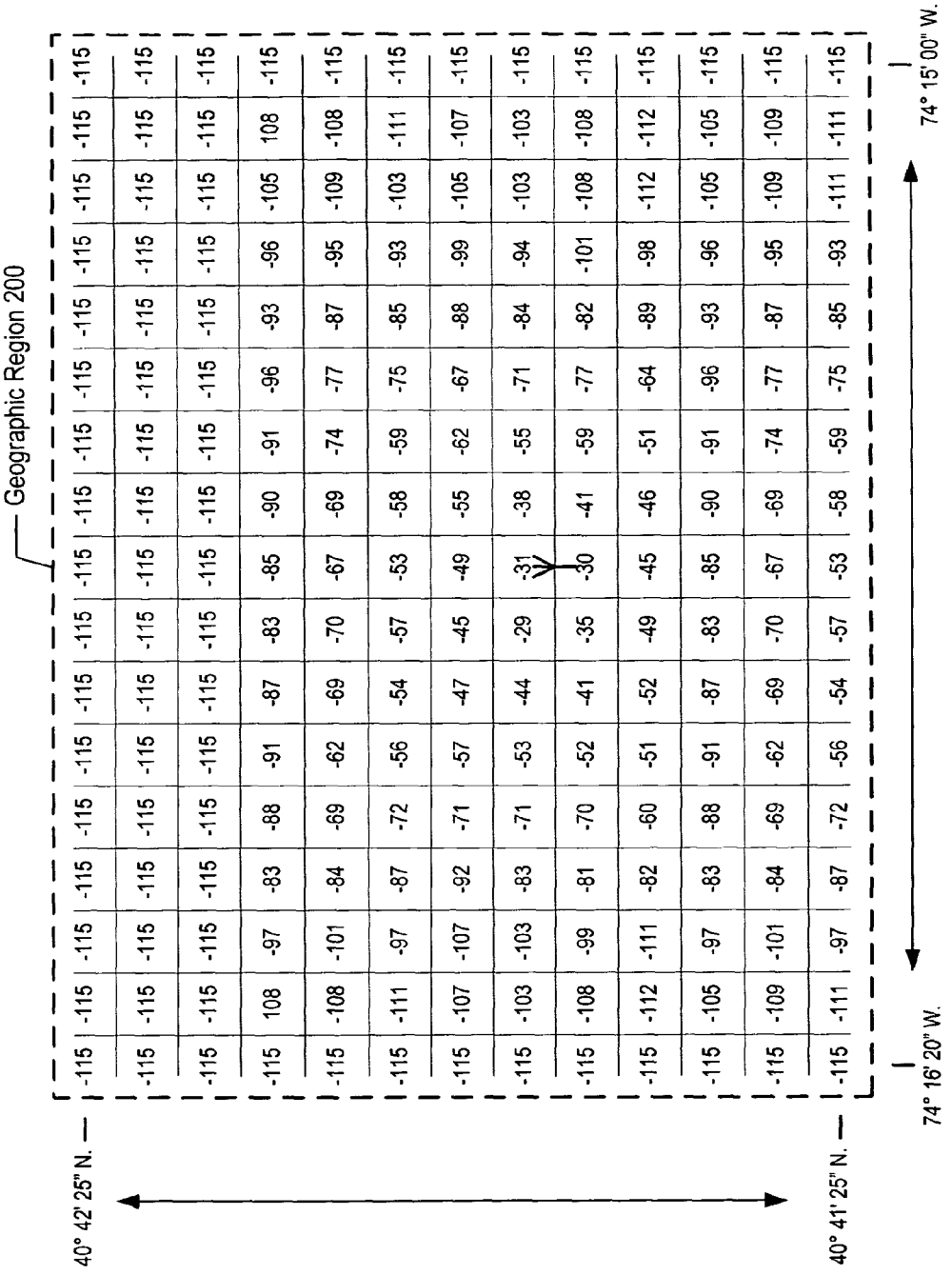
FIG. 10 depicts a map of the signal-strength measurements of the signal radiated from base station 202-3 at each location in geographic region 200.

In accordance with the illustrative embodiment, FIG. 10 depicts the signal-strength of the signal from base station 202-3 (hereinafter referred to as "Signal 3") at each location in geographic region 200. Like Signals 1 and 2, Signal 3 is stronger near base station 202-3 and weaker far away from base station 202-3.

When the signal-strength tuples for each location in geographic region 200 have been determined, they are stored in signal-strength database in a data structure that associates each location with the tuple for that location. The data structure is then stored in signal-strength database 302.

TABLE 3

Signal-Strength Database

| | Signal-Strength Tuple | | |
|---|---|---|---|
| Location | Strength of Signal 1 | Strength of Signal 2 | Strength of Signal 3 |
| $x_1, y_1$ | −115 | −115 | −115 |
| $x_2, y_1$ | −115 | −115 | −111 |
| . | . | . | . |
| . | . | . | . |
| . | . | . | . |
| $x_7, y_7$ | −45 | −51 | −49 |
| $x_8, y_7$ | −46 | −52 | −55 |
| $x_9, y_7$ | −50 | −49 | −62 |
| . | . | . | . |
| . | . | . | . |
| $x_{16}, y_{13}$ | −115 | −96 | −115 |
| $x_{17}, y_{13}$ | −115 | −105 | −115 |

Table 3 depicts a portion of an illustrative data structure for associating each location with the signal-strength tuple for that location.

The three signal-strength measurements in a row of table 1 constitute a "tuple" or non-empty set of ordered elements. For example, the signal-strength tuple at Location $x_7$, $y_7$ are the 3-tuple {−45, −51, −49}. In general, the illustrative embodiment of the present invention estimates the location of a wireless terminal by pattern matching the signal-strength measurements by the wireless terminal at a location against the signal-strength tuples in signal-strength database 302. This process is described in detail below and with respect to operation 402.

From task 502, control passes to operation 402 in FIG. 4.

Figure 11:
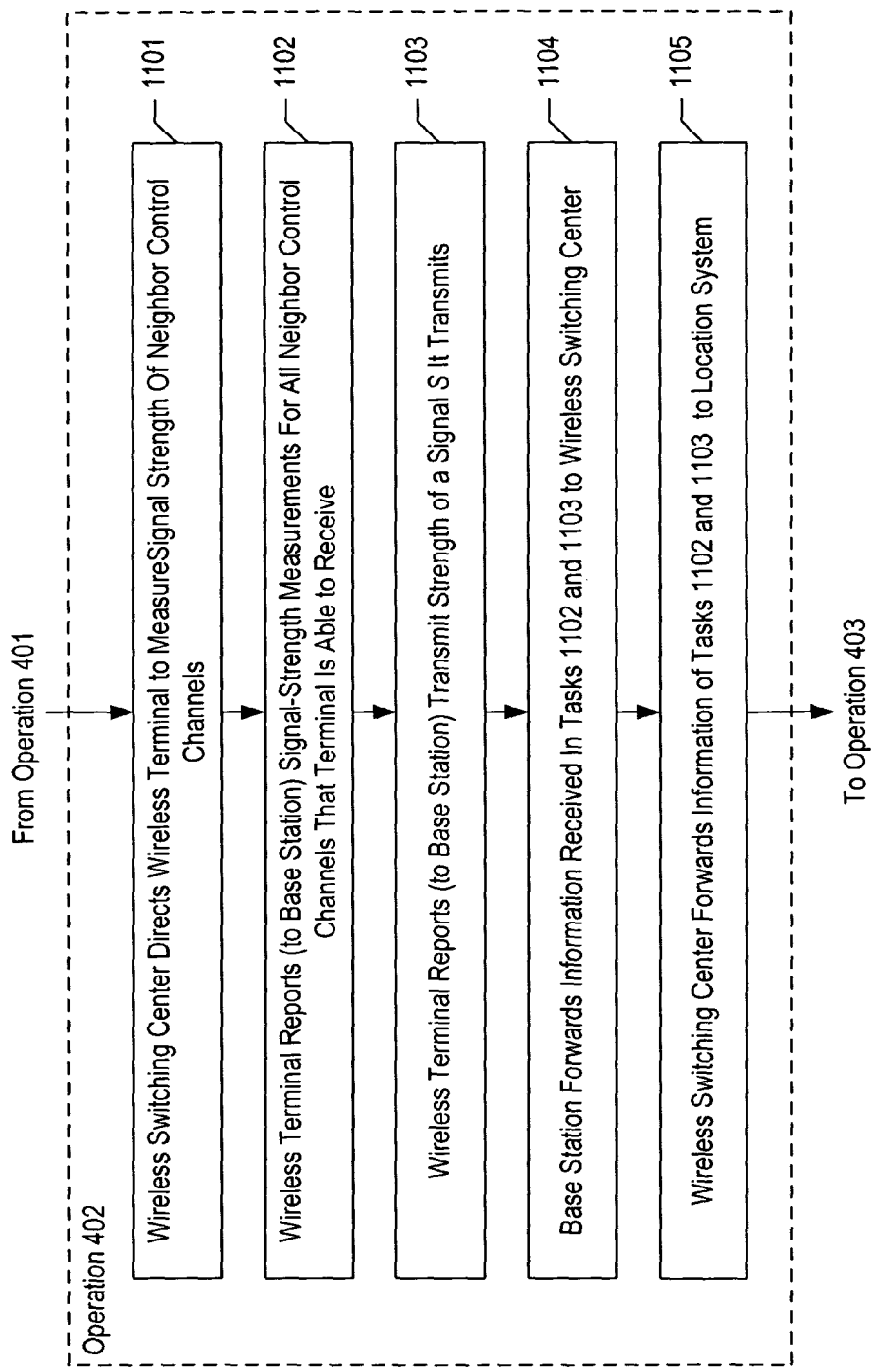
FIG. 11 depicts a flowchart of the salient operations performed in operation 402.

Receipt of Transmit Strength and Signal-Strength Measurements from Wireless Terminal 201—FIG. 11 depicts a flowchart of the salient operations performed in operation 402.

At task 1101, wireless switching center 211 directs wireless terminal 201, in well-known fashion, to (1) attempt to receive the neighbor control channels it might be able to receive, (2) report back a signal-strength value for each received control channel, and (3) report back the transmit strength of a signal that it transmits.

At task 1102, wireless terminal 201 reports, in well-known fashion, signal-strength measurements $R_1 \ldots R_{n-1}$ for some or all of the neighbor control channels that it is able to receive to its serving cell's base station (e.g., base station 202-2 in FIG. 2, etc.).

At task 1103, wireless terminal 201 reports to its serving cell's base station, in well-known fashion, the transmit strength of a signal S transmitted by wireless terminal 201, $R_U$. As is well-known in the art, wireless terminal 201 regularly transmits signals, and any of these signals can be used as "signal S" with respect to tasks 1103 and 1202, disclosed below.

At task 1104, the base station forwards (i) the signal-strength measurements received at task 1102, and (ii) the transmit strength received at task 1103, to wireless switching center 211 in well-known fashion.

At task 1105, wireless switching center 211 forwards (i) the signal-strength measurements received at task 1102, and (ii) the transmit strength received at task 1103, to location system 212 in well-known fashion.

As described above, wireless terminal 201 is incapable of reporting a signal whose signal-strength is equal to −46 dBm or higher, and, therefore, when wireless terminal 201 attempts to report a neighbor control channel whose signal-strength is −46 dBm or higher, wireless terminal 201 simply reports a signal-strength value of −47 dBm for that signal. The significance of this insight is that a reported signal-strength value of −47 dBm might not accurately reflect the magnitude of that signal's strength at that location. To further illustrate the significance of this insight and its effect on the design of the illustrative embodiment, this specification shall describe in detail how two different signal-strength reports are processed by the illustrative embodiment. In accordance with the first report, the signal-strength of all three signals is low enough so that wireless terminal 201 can report the actual strength of the signals. In accordance with the first report, Signal 1=−98, Signal 2=−64, and Signal 3=−51. In accordance with the second report, Signal 1=−98, Signal 2=−64, and Signal 3=−50. How these two types of reports are handled is described below and with respect to FIG. 12.

It will be clear to those skilled in the art how to make and use embodiments of the present invention that perform operation 402. From task 1105, control passes to operation 403 in FIG. 4.

Figure 12:
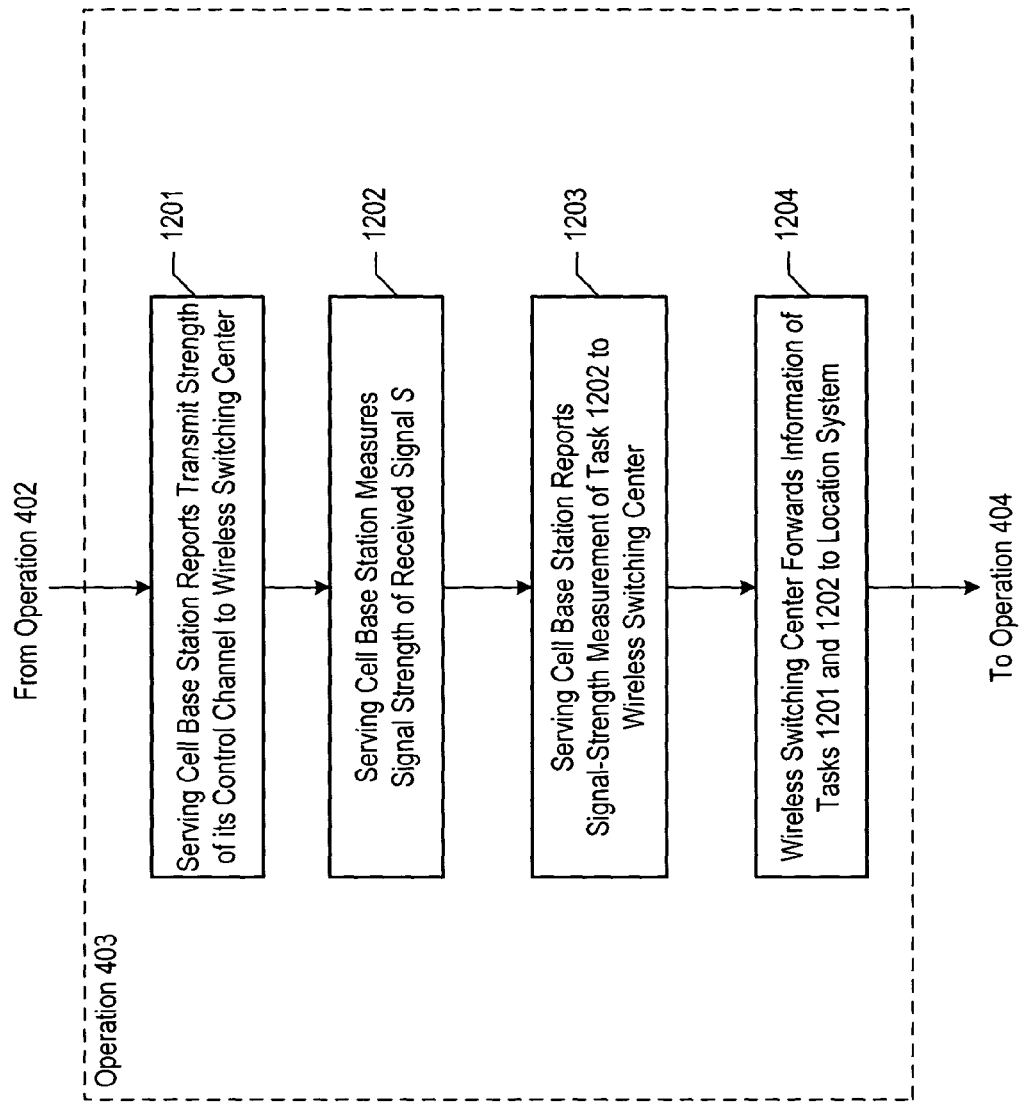
FIG. 12 depicts a flowchart of the salient operations performed in operation 403.

Receipt of (iii) Transmit Strength of Serving Cell Control Channel, $T_D$, and (iv) Signal-Strength Measurement of Signal S from Serving Cell Base Station, $R_U$—FIG. 12 depicts a flowchart of the salient operations performed in operation 403.

At task 1201, the base station of wireless terminal 201's serving cell reports the transmit strength of its control channel, $T_D$, to wireless switching center 211, in well-known fashion. In some other embodiments, this information might be stored at wireless switching center 211 and/or location system 212, since this value should be constant.

At task 1202, the serving cell's base station measures the signal-strength of signal S, $R_U$, as received at the base station, in well-known fashion.

At task 1203, the serving cell's base station reports the signal-strength measurement of task 1202 to wireless switching center 211, in well-known fashion.

At task 1204, wireless switching center 211 forwards (iii) the transmit strength of the serving cell's control channel, $T_D$, and (iv) the signal-strength of signal S, $R_U$, to location system 212 in well-known fashion.

It will be clear to those skilled in the art how to make and use embodiments of the present invention that perform operation 403. From task 1204, control passes to operation 404 in FIG. 4.

Figure 13:
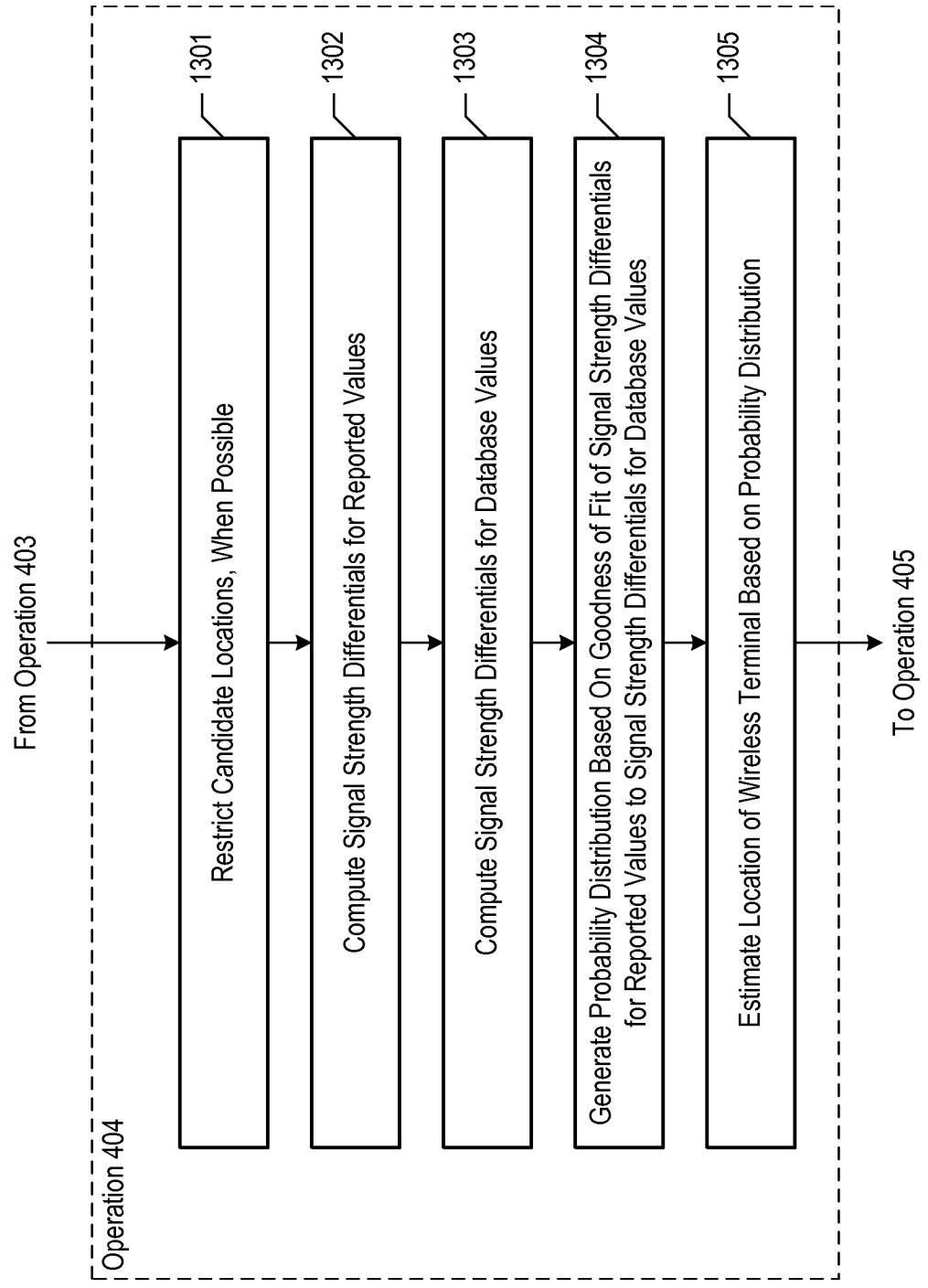
FIG. 13 depicts a flowchart of the salient operations performed in operation 404.

Estimation of the Location of Wireless Terminal 201—FIG. 13 depicts a flowchart of the salient operations performed in operation 404. For pedagogical purposes, operation 404 as depicted in FIG. 13 is described three times. First, operation 404 is described in the abstract with a focus on describing its underlying theory. Next, operation 404 is described as it is applied to the first report, and finally, operation 404 is described as it is applied to the second report.

Estimation in General—Task 1301 begins with 211 (17× 13=211) candidate locations that must be considered as the location for wireless terminal 201, and, therefore, 211 signal-strength tuples (i.e., the 211 tuples in signal-strength database 302) that must be processed. Tasks 1302 through 1305 can be computationally intense, and the computational burden increases with the number of candidate locations that must be considered. Therefore, location system 212 attempts, at task 1301, to reduce the number of candidate locations that must be processed in tasks 1302 through 1305.

To reduce the number of candidate locations that must be processed in tasks 1302 through 1305, location system 212 uses the following observation. When a signal is reported with a maximum signal-strength (i.e., "−47" in the illustrative embodiment), location system 212 can reasonably eliminate from consideration as a candidate location every location where the signal-strength measurement for that signal is below the maximum (minus a factor for measurement errors and systematic bias). In other words, when a signal is reported with a maximum signal-strength, location system 212 can restrict consideration in tasks 1302 through 1305 to those candidate locations where signal-strength database 302 predicts the signal-strength to be greater than or equal to the maximum reportable value (minus a factor for measurement errors and systematic bias). In accordance with the illustrative embodiment, the factor for measurement errors and systematic bias is 3 dBm, and, therefore when a signal is reported with −47, location system 212 can restrict consideration in tasks 1302 through 1305 to those candidate locations where signal-strength database 302 predicts the signal-strength to be greater than or equal to −50 dBm. It will be clear to those skilled in the art how to determine and use other factors for measurement errors and systemic bias.

At task 1302, location system 212 computes the signal-strength differentials for those reported values (i.e., the signal-strength measurements for neighbor control channels, $R_1 \ldots R_{n-1}$, and signal-strength estimate $R_D$) that are not at the maximum signal-strength. In particular, for n reported signals that are not at the maximum signal-strength, n−1 signal-strength differentials are computed where:

$$\Delta S_k = S_k - S_1 \qquad \text{(Eq. 7)}$$

for k=2, 3, . . . n, wherein $\Delta S_k$ is the kth signal-strength differential, $S_k$ is the reported signal-strength of Signal k, and $S_1$ is the reported signal-strength of Signal 1. When m of the reported signals is at the maximum signal-strength (i.e., −47 dBm), then $$n-m-1 \qquad \text{(Eq. 8)}$$

pair-wise differentials for the remaining n-m signals are computed, in well-known fashion. At the end of task 1302, location system 212 will have computed n-m-1 pair-wise differentials, $\Delta \Delta S_2$ through $\Delta S_{n-m}$.

At task 1303, location system 212 computes the signal-strength differentials for only those locations that were not eliminated from consideration in task 1201. Furthermore, location system 212 only computes the signal-strength differentials corresponding to the differentials computed in task 1302; the idea, of course, being to ensure that "apples are compared with apples." In particular, for n reported signals that are not at the maximum signal-strength, n−1 signal-strength differentials are computed where:

$$\Delta R_{k,x,y} = R_{k,x,y} - R_{1,x,y} \qquad \text{(Eq. 9)}$$

for k=2, 3, . . . n, wherein $\Delta R_{k,x,y}$ is the kth signal-strength differential for location x,y, $R_{k,x,y}$ is the signal-strength of Signal k at location x,y in signal-strength database 302, and $R_{1,x,y}$ is the reported signal-strength of Signal 1 at location x,y in signal-strength database 302.

At the end of task 1303, location system 212 will have computed n-m-1 pair-wise differentials, $\Delta R_{2,x,y}$ through $\Delta \Delta R_{n-m,x,y}$, corresponding to the pair-wise differentials computed in task 1303, for all the candidate locations.

At task 1304, location system 212 compares the signal-strength differentials computed in task 1302, $\Delta S_2$ through $\Delta S_{n-m}$, to the signal-strength differentials in task 1303, $\Delta R_{2,x,y}$ through $\Delta R_{n-m,x,y}$, to generate a probability distribution that indicates the goodness of fit between the signal-strength differentials computed from the values received in operations 402 and 403 to the signal-strength differentials computed from the tuples in signal-strength database 302. To accomplish this, the Euclidean norm at each of the i candidate locations is computed for the signal-strength differentials computed from the values received in operations 402 and 403 and each of the signal-strength differentials computed from the tuples in signal-strength database 302. This is described in Equation 10.

$$v_{x,y} = \sqrt{\sum_{2}^{n} (\Delta R_{k,x,y} - \Delta S_k)^2} \qquad \text{(Eq. 10)}$$

wherein $v_{x,y}$ is the Euclidean norm between the signal-strength tuple for location x,y in signal-strength database 302 in comparison to the signal-strength differentials computed from the values received in operations 402 and 403.

Next, the Euclidean norms computed in Equation 4 are turned into unnormalized probabilities by Equation 11:

$$p_{x,y} = e^{\frac{-v_{x,y}^2}{\tau^2}} \qquad \text{(Eq. 11)}$$

where $\tau^2$ represents the amount of uncertainty in both $\Delta S_k$ and $\Delta R_{k,x,y}$.

And finally, the values of $P_{x,y}$ are normalized to generate the probability distribution for the location of wireless terminal 201 in geographic region 200.

At task 1305, location system 212 estimates the location of wireless terminal 201 based on the probability distribution generated in task 1304. In accordance with the illustrative embodiment, location system 212 estimates the location of wireless terminal based on the geometric mean of the probability distribution generated in task 1304. After reading this specification, however, it will be clear to those skilled in the art how to make and use embodiments of the present invention that estimate the location of wireless terminal 201 based on another function of the probability distribution generated in task 1304, such as the maximum likelihood function.

From task 1305, control passes to operation 404 in FIG. 4.

Estimation As Applied to First Report (Signal 1=−98, Signal 2=−64, and Signal 3=−51)—At task 1301, location system 212 cannot eliminate any candidate locations from consideration based on the fact that none of the reported signals is at the maximum reportable value minus the factor for measurement errors and systematic bias (i.e., 3 dBm). In other words, location system 212 cannot eliminate any candidate signal from consideration because all of the signals are at −51 dBm or less. Therefore, location system 212 must consider all 221 candidate locations in tasks 1302 through 1305.

At task 1302, location system 212 computes two (2) signal-strength differentials for the first report in which $R_1$=Signal 1=−98, $R_2$=Signal 2=−64, and $R_3$=Signal 3=−43. In particular, $\Delta R_2$ and $\Delta R_3$ are computed as depicted in Table 4.

TABLE 4

Signal-strength Differentials for
Signal 1 = −98, Signal 2 = −64, and Signal 3 = −43

| k | $\Delta R_k$ | $R_k - R_1$ |
|---|---|---|
| 2 | 34 | −64 − (−98) |
| 3 | 47 | −51 − (−98) |

At task 1303, location system 212 computes two (2) signal-strength differentials for each of the 221 locations in signal-strength database 302, as depicted in Table 5.

TABLE 5

Signal-strength Differentials for Each Tuple
in Signal-Strength Database 302

| Location | $\Delta S_{2,x,y}$ | $\Delta S_{3,x,y}$ |
|---|---|---|
| x1, y1 | −110 − (−110) = 0 | −110 − (−110) = 0 |
| x2, y1 | −110 − (−110) = 0 | −111 − (−110) = −1 |
| x3, y1 | −110 − (−110) = 0 | −97 − (−110) = 3 |
| . | . | . |
| . | . | . |
| x16, y13 | −96 − (−110) = 14 | −110 − (−110) = 0 |
| x17, y13 | −105 − (−110) = 5 | −110 − (−110) = 0 |

At task 1304, location system 212 first computes the Euclidean norm between the signal-strength differentials in Table 2 against the signal-strength differentials for each location in Table 3 to produce the norms shown in Table 6.

TABLE 6

Euclidean Norms for Each Location (First Report)

| Location | Vx,y |
|---|---|
| x1, y1 | 64.66 |
| x2, y1 | 63.81 |
| x3, y1 | 62.13 |
| . | . |
| . | . |
| x16, y13 | 58.52 |
| x17, y13 | 62.18 |

Next, the Euclidean norms in Table 6 are converted to unnormalized probabilities, as described above, and then the unnormalized probabilities are normalized, in well-known fashion, to produce the probability distribution of the location of wireless terminal 201 at each of the 211 locations in geographic region 200.

Estimation as Applied to Second Report (Signal 1=−98, Signal 2=−64, and Signal 3=−50)—At task 1301, location system 212 can perfunctorily eliminate most of the candidate locations from consideration because the reported signal-strength of one of the reported signals—Signal 3=−50 dBm—is greater than the maximum reported value (−47 dBm) minus the factor for measurement errors and systematic bias (3 dBm). In other words, location system 212 can eliminate from consideration any candidate location in which $S_3$ is not at least −50 dBm. Therefore, location system 212 can restrict consideration in tasks 1302 through 1305 to those locations in signal-strength database 302 in which Signal 3 is predicted to be −50 dBm or greater. As can be seen in FIG. 10, there are only 13 locations (x8,y4; x9,y4; x10,y4; x7,y5; x8,y5; x9,y5; x10, y5; x7,y6; x8,t6; x9,y6; x10,y6; x7,y7; x8,y7; x9,y7) at which Signal 3 is predicted to be −50 dBm or stronger, an therefore, location system 212 need only perform tasks 1302 through 1305, in the above-described fashion, on those 13 locations. By reducing the number of candidate locations that need to be processed from 221 to 13, task 1301 has greatly reduced the computational complexity of operation 404.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method comprising:
receiving, by a location system, a report of a signal-strength measurement for a first signal, $R_1$, at a wireless terminal;
when said location system does not receive a report of a signal strength of a second signal, $R_D$, at said wireless terminal, deducing, by said location system, said signal strength of said second signal, $R_D$, based on a transmit strength of a third signal, $T_U$, that is transmitted by said wireless terminal; and
estimating the location of said wireless terminal based on:
(i) said signal strength measurement of said first signal, $R_1$, and
(ii) said deduced signal strength of said second signal, $R_D$.

2. The method of claim 1 wherein deducing said signal strength of said second signal, $R_D$, is also based on a transmit strength of said second signal, $T_D$.

3. The method of claim 1 wherein deducing said signal strength of said second signal, $R_D$, is also based on a signal-strength measurement for said third signal, $R_U$, at the location where said first signal is transmitted.

4. The method of claim 1 wherein deducing said signal strength of said second signal, $R_D$, is also based on an attenuation for said third signal, $A_U$, between said wireless terminal and the location where said first signal is transmitted.

5. The method of claim 1 wherein estimating the location of said wireless terminal comprises pattern matching said deduced signal strength of said second signal, $R_D$, against a database that associates candidate locations for said wireless terminal with predicted signal-strength measurements for said second signal.

6. The method of claim 1 wherein estimating the location of said wireless terminal is based on the absolute magnitude of the difference between said deduced signal strength of said second signal, $R_D$, and said signal-strength measurement of said first signal, $R_1$.

7. The method of claim 1 wherein estimating the location of said wireless terminal comprises generating a two-dimensional probability distribution for the location of said wireless terminal based on the absolute magnitude of the difference between said deduced signal strength of said second signal, $R_D$, and said signal-strength measurement of said first signal, $R_1$.

8. A method comprising:
receiving, by a location system, a report of a signal-strength measurement for a first signal, $R_1$, at a wireless terminal;
when said location system does not receive a report of a signal strength of a second signal, $R_D$, at said wireless terminal, deducing, by said location system, said signal strength of said second signal, $R_D$, based on a signal-strength measurement of a third signal, $R_U$, at the location where said second signal is transmitted; and
estimating the location of said wireless terminal based on:
(i) said signal strength measurement of said first signal, $R_1$, and
(ii) said deduced signal strength of said second signal, $R_D$.

9. The method of claim 8 wherein deducing said signal strength of said second signal, $R_D$, is also based on a transmit strength of said second signal, $T_D$.

10. The method of claim 8 wherein deducing said signal strength of said second signal, $R_D$, is also based on a transmit strength of said third signal, $T_U$, that is transmitted by said wireless terminal.

11. The method of claim 8 wherein deducing said signal strength of said second signal, $R_D$, is also based on an attenuation for said third signal, $A_U$, between said wireless terminal and the location where said second signal is transmitted.

12. The method of claim 8 wherein estimating the location of said wireless terminal comprises pattern matching said deduced signal strength of said second signal, $R_D$, against a database that associates candidate locations for said wireless terminal with predicted signal-strength measurements for said second signal.

13. The method of claim 8 wherein estimating the location of said wireless terminal is based on the absolute magnitude of the difference between said deduced signal strength of said second signal, $R_D$, and said signal-strength measurement of said first signal, $R_1$.

14. The method of claim 8 wherein estimating the location of said wireless terminal comprises generating a two-dimensional probability distribution for the location of said wireless terminal based on the absolute magnitude of the difference between said deduced signal strength of said second signal, $R_D$, and said signal-strength measurement of said first signal, $R_1$.

15. The method of claim 8 further comprising removing the effects of fast fading on $R_U$.

16. A method comprising:
receiving, by a location system, a report of a signal-strength measurement for a first signal, $R_1$, at a wireless terminal;
when said location system does not receive a report of a signal strength of a second signal, $R_D$, at said wireless terminal, deducing, by said location system, said signal strength of said second signal, $R_D$, based on an attenuation of a third signal, $A_U$, that is transmitted by said wireless terminal; and
estimating the location of said wireless terminal based on:
(i) said signal strength measurement of said first signal, $R_1$, and
(ii) said deduced signal strength of said second signal, $R_D$.

17. The method of claim 16 wherein deducing said signal strength of said second signal, $R_D$, is also based on a transmit strength of said second signal, $T_D$.

18. The method of claim 16 wherein deducing said signal strength of said second signal, $R_D$, is also based on a signal-strength measurement for said third signal, $R_U$, at the location where said second signal is transmitted.

19. The method of claim 16 wherein deducing said signal strength of said second signal, $R_D$, is also based on a transmit strength of said third signal, $T_U$.

20. The method of claim 16 wherein estimating the location of said wireless terminal comprises pattern matching said deduced signal strength of said second signal, $R_D$, against a database that associates candidate locations for said wireless terminal with predicted signal-strength measurements for said second signal.

21. The method of claim 16 wherein estimating the location of said wireless terminal is based on the absolute magnitude of the difference between said deduced signal strength of said second signal, $R_D$, and said signal-strength measurement of said first signal, $R_1$.

22. The method of claim 16 wherein estimating the location of said wireless terminal comprises generating a two-dimensional probability distribution for the location of said wireless terminal based on the absolute magnitude of the difference between said deduced signal strength of said second signal, $R_D$, and said signal-strength measurement of said first signal, $R_1$.

23. A location system for estimating the location of a wireless terminal, the location system comprising:
   a receiver for receiving a report of a signal-strength measurement for a first signal, $R_1$, at said wireless terminal; and
   a processor for:
   (A) when said receiver does not receive a report of a signal strength of a second signal, $R_D$, at said wireless terminal, deducing said signal strength of said second signal, $R_D$, based on a transmit strength of a third signal, $T_U$, that is transmitted by said wireless terminal, and
   (B) estimating the location of said wireless terminal based on:
      (i) said signal strength measurement of said first signal, $R_1$, and
      (ii) said deduced signal strength of said second signal, $R_D$.

24. The location system of claim 23 wherein said deducing by said processor of said signal strength of said second signal, $R_D$, is also based on a transmit strength of said second signal, $T_D$.

25. The location system of claim 23 wherein said deducing by said processor of said signal strength of said second signal, $R_D$, is also based on a signal-strength measurement for said third signal, $R_U$, at the location where said first signal is transmitted.

26. The location system of claim 23 wherein said deducing by said processor of said signal strength of said second signal, $R_D$, is also based on an attenuation for said third signal, $A_U$, between said wireless terminal and the location where said first signal is transmitted.

27. The location system of claim 23 further comprising:
   a memory, which is non-volatile, for storing a database that associates candidate locations for said wireless terminal with predicted signal-strength measurements for said second signal, $R_D$; and
   wherein said estimating by said processor of the location of said wireless terminal comprises pattern matching said deduced signal strength of said second signal, $R_D$, against said database.

28. The location system of claim 23 wherein said estimating by said processor of the location of said wireless terminal is based on the absolute magnitude of the difference between said deduced signal strength of said second signal, $R_D$, and said signal-strength measurement of said first signal, $R_1$.

29. The location system of claim 23 wherein said estimating by said processor of the location of said wireless terminal comprises generating a two-dimensional probability distribution for the location of said wireless terminal based on the absolute magnitude of the difference between said deduced signal strength of said second signal, $R_D$, and said signal-strength measurement of said first signal, $R_1$.

30. A location system for estimating the location of a wireless terminal, the location system comprising:
   a receiver for receiving a report of a signal-strength measurement for a first signal, $R_1$, at said wireless terminal; and
   a processor for:
   (A) when said receiver does not receive a report of a signal strength of a second signal, $R_D$, at said wireless terminal, deducing said signal strength of said second signal, $R_D$, based on a signal-strength measurement of a third signal, $R_U$, at the location where said second signal is transmitted, and
   (B) estimating the location of said wireless terminal based on:
      (i) said signal strength measurement of said first signal, $R_1$, and
      (ii) said deduced signal strength of said second signal, $R_D$.

31. The location system of claim 30 wherein said deducing by said processor of said signal strength of said second signal, $R_D$, is also based on a transmit strength of said second signal, $T_D$.

32. The location system of claim 30 wherein said deducing by said processor of said signal strength of said second signal, $R_D$, is also based on a transmit strength of said third signal, $T_U$, that is transmitted by said wireless terminal.

33. The location system of claim 30 wherein said deducing by said processor of said signal strength of said second signal, $R_D$, is also based on an attenuation for said third signal, $A_U$, between said wireless terminal and the location where said second signal is transmitted.

34. The location system of claim 30 further comprising:
   a memory, which is non-volatile, for storing a database that associates candidate locations for said wireless terminal with predicted signal-strength measurements for said second signal, $R_D$; and
   wherein said estimating by said processor of the location of said wireless terminal comprises pattern matching said deduced signal strength of said second signal, $R_D$, against said database.

35. The location system of claim 30 wherein said estimating by said processor of the location of said wireless terminal comprises generating a two-dimensional probability distribution for the location of said wireless terminal based on the absolute magnitude of the difference between said deduced signal strength of said second signal, $R_D$, and said signal-strength measurement of said first signal, $R_1$.

36. A location system for estimating the location of a wireless terminal, the location system comprising:
   a receiver for receiving a report of a signal-strength measurement for a first signal, $R_1$, at said wireless terminal; and
   a processor for:
   (A) when said receiver does not receive a report of a signal strength of a second signal, $R_D$, at said wireless terminal, deducing said signal strength of said second signal, $R_D$, based on an attenuation of a third signal, $A_U$, that is transmitted by said wireless terminal, and
   (B) estimating the location of said wireless terminal based on:
      (i) said signal strength measurement of said first signal, $R_1$, and
      (ii) said deduced signal strength of said second signal, $R_D$.

37. The location system of claim 36 wherein said deducing by said processor of said signal strength of said second signal, $R_D$, is also based on a transmit strength of said second signal, $T_D$.

38. The location system of claim 36 wherein said deducing by said processor of said signal strength of said second signal, $R_D$, is also based on a signal-strength measurement for said third signal, $R_U$, at the location where said second signal is transmitted.

39. The location system of claim 36 wherein said deducing by said processor of said signal strength of said second signal, $R_D$, is also based on a transmit strength of said third signal, $T_U$.

40. The location system of claim 36 further comprising:
- a memory, which is non-volatile, for storing a database that associates candidate locations for said wireless terminal with predicted signal-strength measurements for said second signal, $R_D$; and
- wherein said estimating by said processor of the location of said wireless terminal comprises pattern matching said deduced signal strength of said second signal, $R_D$, against said database.

41. The location system of claim 36 wherein said estimating by said processor of the location of said wireless terminal is based on the absolute magnitude of the difference between said deduced signal strength of said second signal, $R_D$, and said signal-strength measurement of said first signal, $R_1$.

42. The location system of claim 36 wherein said estimating by said processor of the location of said wireless terminal comprises generating a two-dimensional probability distribution for the location of said wireless terminal based on the absolute magnitude of the difference between said deduced signal strength of said second signal, $R_D$, and said signal-strength measurement of said first signal, $R_1$.

* * * * *